United States Patent [19]

Reynolds

[11] Patent Number: 4,842,017

[45] Date of Patent: Jun. 27, 1989

[54] FLUID FLOW CONTROL APPARATUS

[75] Inventor: Graham A. Reynolds, Coventry, England

[73] Assignee: Rolls-Royce plc, London, England

[21] Appl. No.: 177,140

[22] Filed: Apr. 4, 1988

[30] Foreign Application Priority Data

Jun. 3, 1987 [GB] United Kingdom ............... 8712951

[51] Int. Cl.⁴ ..................... G05D 7/06; F16K 31/02
[52] U.S. Cl. ................... 137/601; 251/129.06
[58] Field of Search .................. 137/599, 601; 91/28, 91/29; 251/129.06

[56] References Cited

U.S. PATENT DOCUMENTS

| 1,220,979 | 3/1917 | Gregory | 137/599 |
| 2,694,407 | 11/1954 | Jobson | 137/599 X |
| 3,010,316 | 11/1961 | Snyder | 137/599 X |
| 3,753,449 | 8/1973 | Nelson et al. | 137/601 X |
| 3,827,457 | 8/1974 | Vutz et al. | 137/599 |
| 4,030,523 | 6/1977 | Cram et al. | 137/599 |
| 4,498,471 | 2/1985 | Kranz et al. | 137/599 X |
| 4,690,465 | 9/1987 | Takeda et al. | 251/129.06 X |

FOREIGN PATENT DOCUMENTS

| 0134614 | 3/1985 | European Pat. Off. |
| 0208386 | 2/1986 | European Pat. Off. |
| 868543 | 5/1961 | United Kingdom . |
| 886751 | 1/1962 | United Kingdom . |
| 1185709 | 3/1970 | United Kingdom . |
| 1217225 | 12/1970 | United Kingdom . |
| 1410312 | 10/1975 | United Kingdom . |
| 2052871 | 1/1981 | United Kingdom . |

Primary Examiner—Stephen Hepperle
Attorney, Agent, or Firm—Cushman, Darby & Cushman

[57] ABSTRACT

A valve is one of a plurality of similar valves set out in the form of a matrix to constitute a portion of the fuel control system of a gas turbine engine. The valve comprises a piezo-electric crystal and is deformable by the application of a potential difference thereto from a first, non-deformed condition in which the crystal blocks the orifice to second deformed condition in which the orifice is unblocked. At least some of the valves are normally redundant but are caused to become operable in the event of the failure of any of the other operable valves.

7 Claims, 1 Drawing Sheet

FLUID FLOW CONTROL APPARATUS

This invention relates to fluid flow control apparatus.

There are many instances in which valves are used to control the flow rate of a fluid. For instance the fluid in question may be a fuel and its flow rate the determining factor in the power setting of a machine powered by that fuel. Accurate and reliable control of the fuel flow by the valve is often of critical importance to the operation of the machine. Thus if the valve in question should malfunction or fail completely, the consequences could be serious. Thus for instance, if the machine in question was a gas turbine engine, unreliable control of the fuel flow to the engine could result in the engine being damaged through overspeeding.

It is an object of the present invention to provide a fluid flow control apparatus which substantially avoids the reliability and accuracy problems associated with individual valves.

According to the present invention, a fluid flow control apparatus comprises a fluid flow control member having an array of valves adapted to cooperate in parallel relationship, each of said valves being individually operable between a fully open position and a fully closed position, and control means adapted to provide the opening and closing of said valves in accordance with a desired fluid flow across said fluid flow control member, at least some of said valves being normally redundant but which are caused to become selectively operable by said control member in the event of the failure of any of the other operable valves in said fluid flow control member.

The invention will now be described, by way of example, with reference to the accompanying drawings in which.

Figure 1:
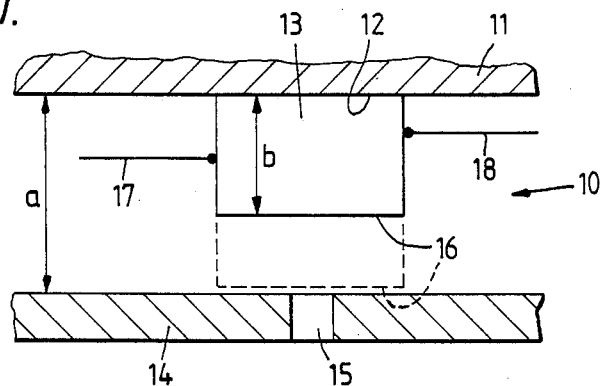
FIG. 1 is a sectioned side view of a valve in a fluid flow control member in accordance with the present invention.

With reference to FIG. 1 a valve generally indicated at 10 comprises a support member 11 to which is bonded one face 12 of a piezo-electric crystal 13. A plate 14 is spaced apart from the support member 11 by a distance a which is equal to the thickness of the piezo-electric crystal 13 when in an unstressed condition (as indicated in interrupted lines).

The plate 14 has an orifice 15 which is blocked by a flat face 16 of the piezo-electric crystal 13 opposite to its face 12. However if a potential difference is applied to the piezo-electric crystal 13 via the leads 17 and 18, the crystal 13 is stressed and elastically deforms to assume the shape shown in solid lines in FIG. 1 with a thickness b, thereby unblocking the orifice 15. It will be seen therefore that the valve 10 may be opened or closed depending upon whether a potential difference is applied across the piezo-electric crystal 13.

A further feature of the valve 10 is that the spacing between the piezo-electric crystal and the orifice 15 is dependent upon the magnitude of the potential difference applied to the crystal 13 up to the potential difference which results in the crystal 13 being fully saturated and hence fully deformed. This being so the application of varying potential differences to the piezo-electric crystal 13 results in correspondingly varying distances between the face 16 of the crystal 13 and the orifice 15.

Figure 2:
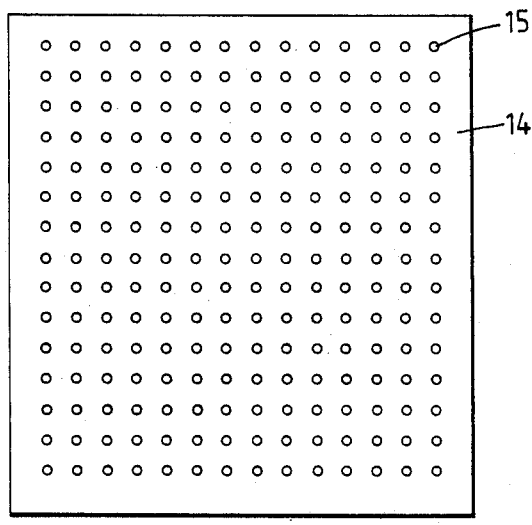
FIG. 2 is a plan view of an orifice plate for use with a fluid flow control member in accordance with the present invention.

The valve 10 is used in combination with a number of similar valves. Thus the orifice 15 is one of a large number of similar orifices in the plate 14 as can be seen in FIG. 2 each of which is associated with a corresponding crystal 13. In operation the plate 14 is interposed between a source of pressurised liquid fuel and a gas turbine engine (not shown) which is adapted to be powered by that fuel. Thus when all of the piezo-electric crystals 13 are in a non-stressed situation i.e. when they do not have a potential difference applied across them, the orifices 15 are blocked and hence there is no fuel flow to the gas turbine engine. However if a potential difference is applied across some or all of the piezo-electric crystals 13 then either a partial flow or a full flow of fuel as appropriate is supplied to the gas turbine engine. It will be seen therefore that a fluid flow control apparatus comprising a plurality of the valves 10 constitutes a convenient means for controlling the amount of fuel delivered to a gas turbine engine.

If it is desired to have more control over the amount of fuel delivered to the engine than can be provided by a fluid flow control apparatus comprising valves 10 operated so as to be either fully open or fully closed, then varying potential differences could be applied to the crystals 13 to vary the distances between the crystals 13 and the orifices 15. Such variation in the distances between the crystals 13 and the orifices 15 controls the flow rate of fuel through the orifices 15 and thereby facilitates greater control over the total flow rate of fuel through the orifices 15.

Figure 3:
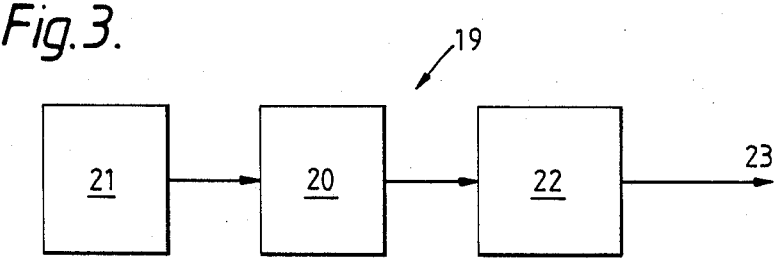
FIG. 3 is a schematic diagram of a gas turbine engine fuel control system which utilizes a fluid flow control apparatus in accordance with the present invention.

The valves 10 are controlled electronically by a suitable microprocessor in order that an acceptably rapid response rate can be achieved. Such a control system 19 is shown schematically in FIG. 3.

The control system 19 comprises a microprocessor control chip 20 which acts upon an input signal from a detector device 21. The detector device 21 is adapted to provide an output signal which is representative of the load driven by, in this instance, a gas turbine engine. The control chip 20, when informed of the magnitude of the engine load, calculates the number of valves 10 in a matrix 22 of valves 10 which must be open in order to provide the necessary fuel flow to the gas turbine engine.

If a change in load occurs, it is detected by the detector device 21 and an appropriate signal is sent to the control chip 20 which then in turn calculates the number of valves 10 which must be opened or closed to provide a change in fuel flow which will maintain the gas turbine engine in known reference position e.g. at a contant rotational speed.

A matrix 22 of valves 10 is liable to provide an incorrect fuel flow if, for instance some of the valves 10 were to block or otherwise cease to function in the correct manner. In order to cater for such an eventuality, some of the valves 10 in the matrix 22 are normally redundant i.e. are fixed in the closed position. The control chip 20 is adapted to regularly interrogate in turn each of the valves 10 in the matrix 22 in order to determine which is not functioning. In the event of a non-functioning valve 10 being discovered, the control chip 20 records its location and ensures that no further attempt is made to operate it. An alternative valve 10 from the group of redundant valves 10 is then brought into operation as a replacement. The control chip 20 maintains a record of all non-functioning valves 10 so that when all redundant valves 10 have been brought into operation, a suitable indication is given that maintenance on the valve matrix 22 is necessary.

The orifices 15 need not necessarily all be of the same size so that a reduction in the total number of valves 10 in a matrix 22 may be achieved. However multiples of each valve 10 size are needed in such circumstances in order that redundant valves 10 may be brought into operation in the case of valve 10 failure.

Although the present invention has been described with reference to piezo-electric type valves it will be appreciated that it is also applicable to other valve types.

I claim:

1. An array of fluid flow valves for use with a fluid flow controller, the controller monitoring and controlling the fluid flow through the array by outputting data defining the open or closed positions of the valves in accordance with a desired fluid flow, the array comprising:
   primary valves to regulate the flow of fluid through the array in accordance with the controller data, and
   redundancy valves to selectively operate only when any said primary valve becomes inoperable, each said primary valve and redundancy valve including:
   a member having an orifice adapted for the passage of a fluid through the orifice,
   a piezo-electric crystal, and
   means, electrically connected to the controller, for providing a potential difference across the crystal to deform the crystal, the crystal being disposed within said orifice to selectively block and unblock said orifice in accordance with said deformation.

2. An array of fluid flow valves according to claim 1, wherein said piezo-electric crystal blocks said orifice when in a nondeformed condition and deforms under the influence of the potential difference across the crystal to unblock said orifice.

3. An array of fluid flow valves according to claim 1, wherein the potential difference provided across the crystal is variable so that the resultant degree of deformation of the crystal is correspondingly variable.

4. An array of fluid flow valves according to claim 1, wherein the valves are adapted for the passage of a liquid.

5. An array of fluid flow valves according to claim 1, wherein the member having an orifice includes a plate member.

6. An array of fluid flow valves according to claim 5, wherein the member having an orifice further includes a support member spaced apart from the plate member, the crystal being mounted on said support member.

7. An array of fluid flow valves according to claim 1, wherein said array comprises a part of the fuel control system of a gas turbine engine.

* * * * *